(12) United States Patent
Pettersson et al.

(10) Patent No.: US 10,097,766 B2
(45) Date of Patent: Oct. 9, 2018

(54) PROVISION OF EXPOSURE TIMES FOR A MULTI-EXPOSURE IMAGE

(71) Applicant: Microsoft Technology Licensing, LLC, Redmond, WA (US)

(72) Inventors: Gustaf Pettersson, Ljungbyed (SE); Karim Benchemsi, Lund (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/253,623

(22) Filed: Aug. 31, 2016

(65) Prior Publication Data

US 2018/0063400 A1    Mar. 1, 2018

(51) Int. Cl.
| H04N 9/73 | (2006.01) |
| H04N 5/235 | (2006.01) |
| H04N 5/232 | (2006.01) |
| H04N 5/345 | (2011.01) |
| H04N 5/353 | (2011.01) |
| H04N 5/355 | (2011.01) |

(52) U.S. Cl.
CPC ......... *H04N 5/2353* (2013.01); *H04N 5/2351* (2013.01); *H04N 5/2355* (2013.01); *H04N 5/2356* (2013.01); *H04N 5/23219* (2013.01); *H04N 5/23222* (2013.01); *H04N 5/3452* (2013.01); *H04N 5/3535* (2013.01); *H04N 5/35581* (2013.01)

(58) Field of Classification Search
CPC ............. H04N 5/2353; H04N 5/23219; H04N 5/23222; H04N 5/2355; H04N 5/35581; H04N 5/35554; H04N 5/235; H04N 5/2351; H04N 5/3535; H04N 5/2356; H04N 5/2327; H04N 5/2256; G06T 2207/10144; G06T 5/50; G06T 2207/20208; G06T 2207/20221
USPC ........................................................ 348/362
See application file for complete search history.

(56) References Cited

U.S. PATENT DOCUMENTS

| 7,239,805 | B2 | 7/2007 | Uyttendaele et al. |
| 8,199,222 | B2 | 6/2012 | Drimbarean et al. |
| 8,582,001 | B2 | 11/2013 | Tzur et al. |
| 8,737,755 | B2 | 5/2014 | Prentice |
| 8,885,978 | B2 | 11/2014 | Cote et al. |
| 8,890,986 | B2 | 11/2014 | Smith et al. |
| 8,977,073 | B2 | 3/2015 | Kwon et al. |
| 8,988,567 | B2 | 3/2015 | Kwan et al. |

(Continued)

OTHER PUBLICATIONS

Cho, et al., "Alternating line high dynamic range imaging", In Proceedings of the 17th International Conference on Digital Signal Processing, Jul. 6, 2011, 6 pages.

(Continued)

*Primary Examiner* — Yogesh Aggarwal

(57) ABSTRACT

According to one aspect, there is provided an apparatus comprising at least one processing unit and at least one memory. The at least one memory stores program instructions that, when executed by the at least one processing unit, cause the apparatus to control a first set of pixels of an image sensor for exposure of a scene for a camera viewfinder, the image sensor having at least two sets of pixels enabling different exposure times, and control a second set of pixels of the image sensor for exposure analysis of the scene for images to be captured for a multi-exposure image.

20 Claims, 3 Drawing Sheets

(56) References Cited

U.S. PATENT DOCUMENTS

| | | |
|---|---|---|
| 9,077,910 B2 | 7/2015 | Ninan et al. |
| 9,307,161 B2 | 4/2016 | Lee et al. |
| 2005/0083419 A1* | 4/2005 | Honda .................. H04N 5/361 |
| | | 348/244 |
| 2008/0094486 A1 | 4/2008 | Fuh et al. |
| 2009/0003708 A1* | 1/2009 | Steinberg .............. G06T 7/0081 |
| | | 382/190 |
| 2009/0140122 A1* | 6/2009 | Suzuki .............. H04N 5/37457 |
| | | 250/201.2 |
| 2010/0066858 A1* | 3/2010 | Asoma .................. H04N 5/232 |
| | | 348/229.1 |
| 2010/0271512 A1 | 10/2010 | Garten |
| 2012/0307130 A1* | 12/2012 | Usui .................. H04N 5/23293 |
| | | 348/345 |
| 2014/0055638 A1* | 2/2014 | Son ..................... H04N 5/2353 |
| | | 348/229.1 |
| 2014/0307141 A1 | 10/2014 | Tanaka et al. |
| 2015/0169204 A1 | 6/2015 | Deselaers et al. |
| 2015/0201118 A1 | 7/2015 | Lee et al. |
| 2015/0312464 A1 | 10/2015 | Peng |
| 2016/0173751 A1* | 6/2016 | Nakata ................ H04N 5/2355 |
| | | 348/362 |
| 2016/0248990 A1 | 8/2016 | Kim et al. |
| 2017/0085806 A1* | 3/2017 | Richards ................ H04N 5/243 |

OTHER PUBLICATIONS

Cheng, et al., "High Dynamic Range image capturing by Spatial Varying Exposed Color Filter Array with specific demosaicking algorithm", In Proceedings of IEEE Pacific Rim Conference on Communications, Computers and Signal Processing, Aug. 23, 2009, pp. 648-653.

Huang, et al., "High dynamic range imaging technology for micro camera array", In Proceedings of Asia-Pacific Signal and Information Processing Association Annual Summit and Conference, Dec. 9, 2014, 4 pages.

"International Search Report and Written Opinion Issued in PCT Application No. PCT/US2017/048096", dated Nov. 29, 2017, 13 Pages.

* cited by examiner

PROVISION OF EXPOSURE TIMES FOR A MULTI-EXPOSURE IMAGE

BACKGROUND

In modern cameras, it is common to take multi-exposure images, for example, High Dynamic Range (HDR) images. To get optimal quality in such cases it is important to set the exposure times in a way that they make a large part of a scene as well exposed as possible in one or more of the images. Further, as image capturing locations and their circumstances are unique, this creates challenges for setting the exposure times correctly.

SUMMARY

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one embodiment, an apparatus is provided. The apparatus comprises at least one processing unit and at least one memory. The at least one memory stores program instructions that, when executed by the at least one processing unit, cause the apparatus to control a first set of pixels of an image sensor for exposure of a scene for a camera viewfinder, the image sensor having at least two sets of pixels enabling different exposure times, and to control a second set of pixels of the image sensor for exposure analysis of the scene for images to be captured for a multi-exposure image.

In another embodiment, an apparatus is provided. The apparatus comprises a camera comprising an image sensor configured to capture image data of a scene, the image sensor having at least two sets of pixels enabling different exposure times, a viewfinder configured to display image data captured with the image sensor, and a controller configured to control a first set of pixels of the image sensor for exposure for the viewfinder and a second set of pixels of the image sensor for exposure analysis of the scene for images to be captured for a multi-exposure image.

In another embodiment, a method is provided. The method comprises controlling, by at least one processor, a first set of pixels of an image sensor for exposure of a scene for a camera viewfinder, the image sensor having at least two sets of pixels enabling different exposure times, and controlling, by the at least one processor, a second set of pixels of the image sensor for exposure analysis of the scene for images to be captured for a multi-exposure image.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples. Furthermore, as used in this application and in the claims, the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items.

In the following description, the term "multi-exposure image" refers to an image which constructs a single image from multiple images obtained using different exposure times.

When taking multi-exposure images, one possibility is to use the auto exposure from a viewfinder and to use preset longer and shorter exposures relative to a base image. This will not, however, provide optimal results in many cases. Another possibility is to vary the exposure time of the viewfinder stream. This, however, will cause the visible viewfinder stream to change brightness as different exposure times are set. Thus serious implications for the user experience are caused as the brightness of the viewfinder will change dramatically.

In at least some embodiments a solution is provided where exposure times of a multi-exposure image are customized for each scene. Further, user experience is maintained as the separate set of pixels is used for exposure of a scene for a camera viewfinder and there are no significant changes in the brightness of the viewfinder. Further, in at least some embodiments, the number of images needed to be taken for the multi-exposure image can be optimized.

In at least some embodiments, a first set of pixels of an image sensor is controlled for exposure of a scene for a camera viewfinder, the image sensor having at least two sets of pixels enabling different exposure times. At the same time, a second set of pixels of the image sensor is controlled for exposure analysis of the scene for images to be captured for a multi-exposure image.

Figure 1:
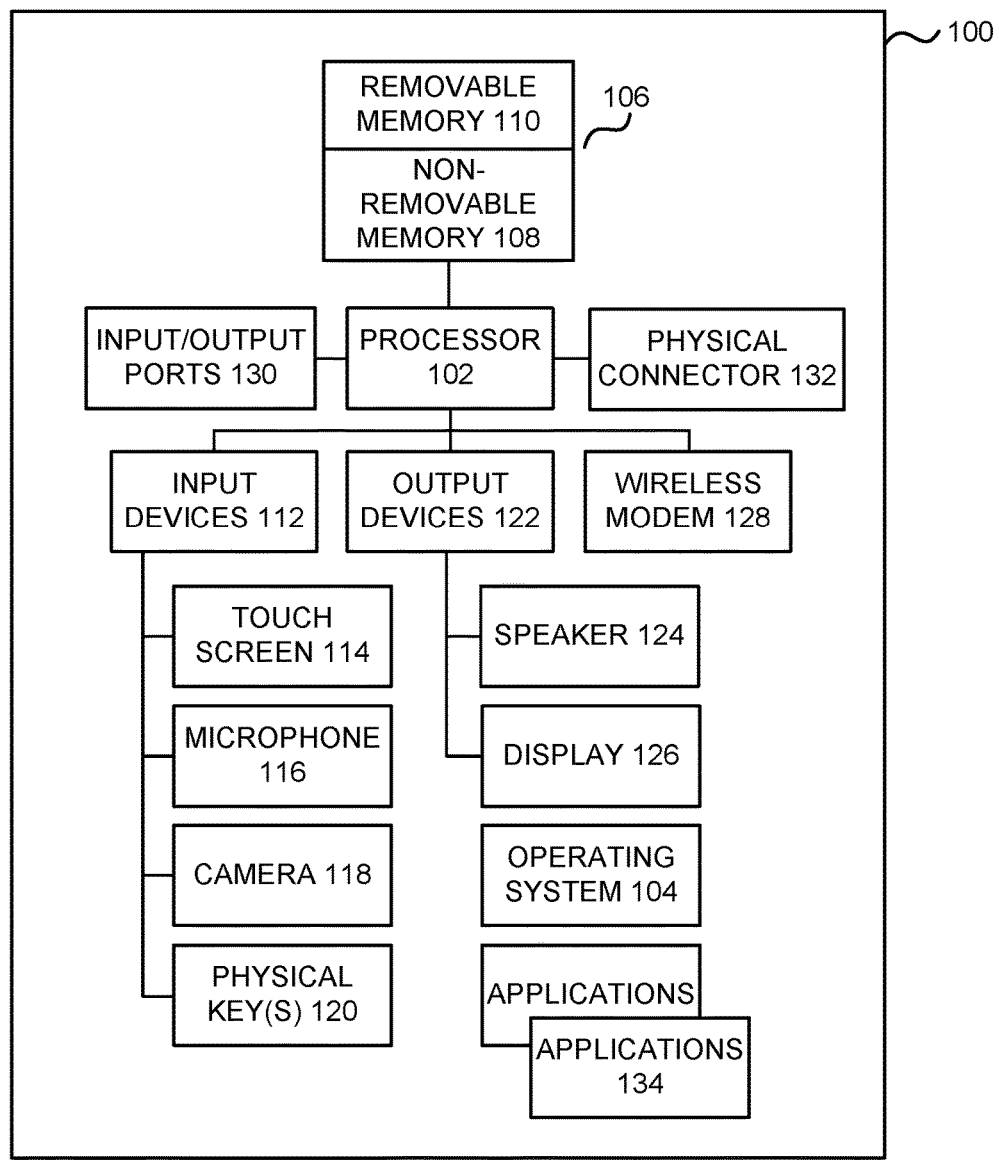
FIG. 1 is a system diagram depicting an apparatus including a variety of optional hardware and software components.

FIG. 1 is a system diagram depicting an apparatus 100 including a variety of optional hardware and software components. Any components in the apparatus 100 can communicate with any other component, although not all connections are shown, for ease of illustration. The apparatus 100 can be any of a variety of computing devices (for example, a cell phone, a smartphone, a handheld computer, a tablet computer, a laptop computer, a personal computer, a Personal Digital Assistant (PDA), a digital camera etc.).

The illustrated apparatus 100 can include a controller or processor 102 (e.g., signal processor, microprocessor, ASIC, or other control and processing logic circuitry) for performing such tasks as signal coding, data processing, input/output processing, power control, and/or other functions. An operating system 104 can control the allocation and usage of the components and support for one or more application programs 134. The application programs can include common mobile computing applications (e.g., email applications, calendars, contact managers, web browsers, messaging applications), or any other computing application.

The illustrated apparatus 100 can include a memory 106. The memory 106 can include non-removable memory 108 and/or removable memory 110. The non-removable memory 108 can include RAM, ROM, flash memory, a hard disk, or other well-known memory storage technologies. The removable memory 110 can include flash memory or a Subscriber Identity Module (SIM) card, which is well known in mobile communication systems, or other well-known memory storage technologies, such as "smart cards". The memory 106 can be used for storing data and/or code for running the operating system 104 and the applications 134. If the apparatus 100 is a mobile phone or smart phone, the memory 106 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The apparatus 100 can support one or more input devices 112, such as a touchscreen 114, microphone 116, camera 118 and/or physical keys or a keyboard 120 and one or more output devices 122, such as a speaker 124 and a display 126. Some devices can serve more than one input/output function. For example, the touchscreen 114 and the display 126 can be combined in a single input/output device. The input devices 112 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 104 or applications 134 can comprise speech-recognition software as part of a voice user interface that allows a user to operate the apparatus 100 via voice commands. Further, the apparatus 100 can comprise input devices and software that allows for user interaction via a user's spatial gestures, such as detecting and interpreting gestures to provide input to a gaming application.

A wireless modem 128 can be coupled to an antenna (not shown) and can support two-way communications between the processor 102 and external devices, as is well understood in the art. The modem 128 is shown generically and can include a cellular modem for communicating with the mobile communication network and/or other radio-based modems (e.g., Bluetooth or Wi-Fi). The wireless modem 128 is typically configured for communication with one or more cellular networks, such as a GSM network for data and voice communications within a single cellular network, a WCDMA (Wideband Code Division Multiple Access) network, an LTE (Long Term Evolution) network, a 4G LTE network, between cellular networks, or between the mobile apparatus and a public switched telephone network (PSTN) etc.

The apparatus 100 can further include at least one input/output port 130 and/or a physical connector 132, which can be a USB port, a USB-C port, IEEE 1394 (FireWire) port, and/or RS-232 port. The illustrated components are not required or all-inclusive, as any components can be deleted and other components can be added.

Any combination of the illustrated components disclosed in FIG. 1, for example, at least one of the processor 102 and the memory 106 may constitute means for controlling a first set of pixels of an image sensor for exposure of a scene for a camera viewfinder, the image sensor having at least two sets of pixels enabling different exposure times, and means for controlling a second set of pixels of the image sensor for exposure analysis of the scene for images to be captured for a multi-exposure image.

Figure 2A:
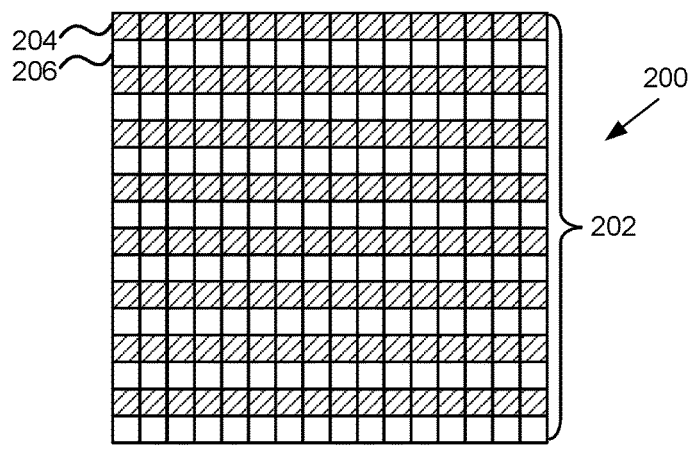
FIG. 2A illustrates pixels of an image sensor according to one embodiment.

FIG. 2A illustrates pixels of an image sensor 200 according to one embodiment. The image sensor 200 comprises pixels 202. Filled pixels 204 represent a first set of pixels and non-filled pixels 206 represent a second set of pixels. Although the first and second pixels sets 204, 206 are illustrated as odd and even rows, in another embodiment the first and second pixel sets 204, 206 may be arranged in a chessboard pattern where every other pixel belongs to the first pixel set 204 and every other to the second pixel set 206. The image sensor 200 is able to vary exposure time of the pixels 200 so that the first pixel set 204 is exposed using a first exposure time and the second pixel set 206 is exposed using a second exposure time. In one embodiment, the image sensor 200 is a sensor supporting an interlaced exposure. In one embodiment, in a sensor with a Bayer-filter, the two pixel sets are a pair of rows.

Figure 2B:
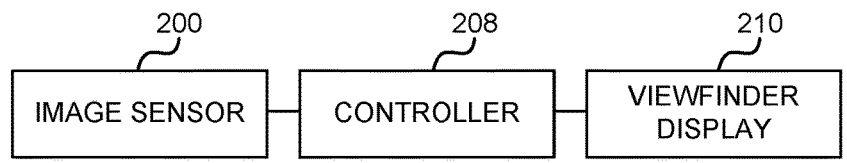
FIG. 2B illustrates a block diagram for controlling an image sensor and a viewfinder display with a controller according to one embodiment.

FIG. 2B illustrates a block diagram for controlling an image sensor 200 and a viewfinder display 210 with a controller 208 according to one embodiment.

Figure 3:
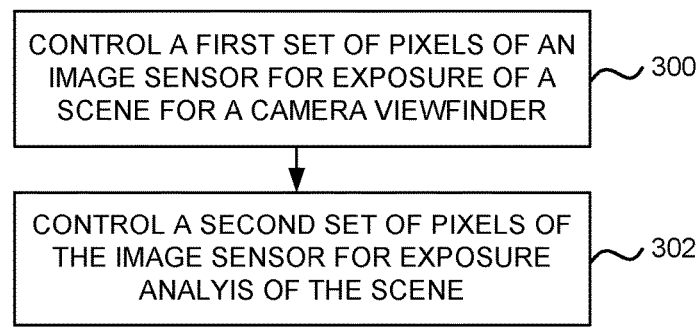
FIG. 3 illustrates a flow diagram of a method for controlling an image sensor according to one embodiment.

FIG. 3 illustrates a flow diagram of a method for controlling an image sensor according to one embodiment. The image sensor may be the image sensor 200 illustrated in FIG. 2A and FIG. 2B.

At 300 the first set of pixels 204 of the image sensor 200 is controlled by the controller 208 for exposure of a scene for a camera viewfinder. Thus, the first set of pixels 204 is exposed as a regular camera viewfinder and shown on a viewfinder screen. An image stream of a scene to be photographed is displayed on the viewfinder display 210. As the first set of pixels is used for exposure of a scene only for a camera viewfinder, there are no significant changes in the brightness of the viewfinder.

At 302 the second set of pixels of the image sensor 200 is controlled by the controller 208 for exposure analysis of the scene for images to be captured for a multi-exposure image. Thus, the first and second sets of pixels 204, 206 are used simultaneously for different purposes. Thus, as the second set of pixels 206 is used for exposure analysis of the scene for images to be captured for a multi-exposure image, the viewfinder image is not affected as it is provided by the first set of pixels 204. The controller 208 may refer to at least one processor connected to at least one memory, and the at least one memory may store program instructions that, when executed by the at least one processor, cause the performance of the steps 300 and 302.

When separate sets of pixels are used for a camera viewfinder and for exposure analysis of a scene for images to be captured for a multi-exposure image, exposure times of the multi-exposure image are customized for each scene while maintaining user experience. Further, in some embodiments, this enables a solution where the number of images to be taken for the multi-exposure image varies depending on the scene.

Exposure analysis may refer to one or more analysis steps that enable determining exposure times for the images to be captured for the multi-exposure image. For example, the exposure analysis may analyze light intensity of different areas of the scene. Further, the exposure analysis may also determine how many images are needed for the multi-capture image. The exposure analysis may use various image processing routines.

Figure 4:
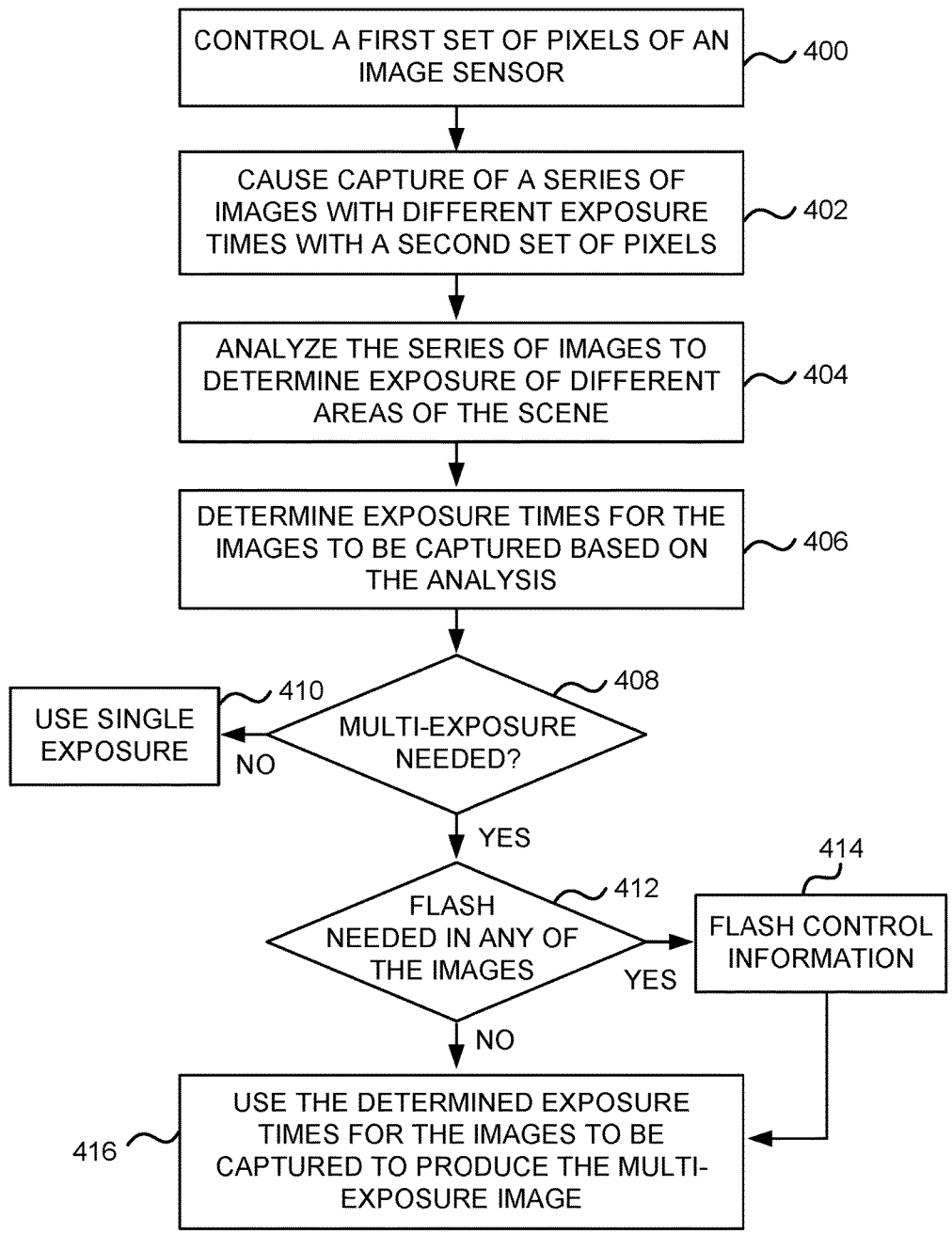
FIG. 4 illustrates a flow diagram of a method for controlling an image sensor according to one embodiment.

FIG. 4 illustrates a flow diagram of a method for controlling an image sensor according to one embodiment. The image sensor may be the image sensor 200 illustrated in FIG. 2A and FIG. 2B.

At 400 the first set of pixels 204 of the image sensor 200 is controlled for exposure of a scene for a camera viewfinder. Thus, the first set of pixels 204 is exposed as a regular camera viewfinder and shown on a viewfinder screen. An image stream of a scene to be photographed is displayed on the viewfinder display.

At 402 a series of images with different exposure times is caused to be captured with the second set of pixels 206. The purpose of the second set of pixels 206 is to enable analyzation of the light in the scene.

At 404 the captured series of images is analyzed to determine light intensity of different areas of the scene. In other words, how well exposed different areas are in the scene.

At 406 the data from the analysis is used to determine exposure times for the images to be captured in order to produce the final multi-exposure image. If at 408 the end results of the analysis is that only a single image is needed (i.e. no multi-exposure image is needed), at 410 a single exposure time is used for a single image without multi-exposure. On the other hand, if at 408 the end result is that multiple exposure times are needed, at 412 it may be determined whether a flash is needed in any of the images. In some embodiments, it may be that some parts of the scene can be illuminated only using the flash. If no flash is needed, at 416 the determined exposure times are used for the images to be captured in order to produce the multi-exposure image. If flash is needed in at least one of the images, flash control information 414 is provided in order to synchronize the flash with the exposure times.

Further, in one embodiment, an apparatus may comprise two separate image sensors, and the controller 208 is configured to control a first image sensor for exposure of a scene for a camera viewfinder. Simultaneously, the controller 208 is configured to control a second image sensor having at least two sets of pixels enabling different exposure times. The controller 208 is configured to control a first set and a second set of image pixels of the second image sensor for exposure analysis of the scene for images to be captured for a multi-exposure image. When two separate image sensors are used, it is possible to use different exposure times with the first and second sets of pixels and thus to shorten the time needed for determining the final exposure times for the images to be captured for the multi-exposure image.

In some embodiments, when determining exposure times for the images to be captured in order to produce the final multi-exposure image, depending on the scene and based on the analysis, the number of images to be captured for the multi-exposure image may be adaptable. A more difficult scene in terms of lighting may require more images to be taken in order to produce the final multi-exposure image than a scene having a different type of lighting conditions. Further, in some embodiments, if a face or faces is detected in the scene, this may cause the analysis to keep the number of images to be captured low or lower than in a situation where there are no faces detected. This may be due to the fact that the face provides an indication that movement is probable in the images to be captured. Further, in some embodiments, movement may be detected based on the captured series of images, and information relating to the movement may be used in determining exposure times and/or the number of images to be captured for the multi-exposure image.

When separate sets of pixels are used for a camera viewfinder and for exposure analysis of a scene for images to be captured for a multi-exposure image, exposure times of the multi-exposure image are customized for each scene while maintaining user experience. Further, in some embodiments, this enables a solution where the number of images to be taken for the multi-exposure image varies depending on the scene.

According to another aspect, there is provided an apparatus comprising at least one processing unit and at least one memory. The at least one memory stores program instructions that, when executed by the at least one processing unit, cause the apparatus to control a first set of pixels of an image sensor for exposure of a scene for a camera viewfinder, the image sensor having at least two sets of pixels enabling different exposure times, and control a second set of pixels of the image sensor for exposure analysis of the scene for images to be captured for a multi-exposure image.

In an embodiment, the at least one memory stores program instructions that, when executed by the at least one processing unit, cause the apparatus to cause capture of a series of images with different exposure times with the second set of pixels, analyze the series of images to determine light intensity of different areas of the scene, and determine exposure times for the images to be captured for the multi-exposure image based on the analysis.

In an embodiment, in any combination with any of the above embodiments, the at least one memory stores program instructions that, when executed by the at least one processing unit, cause the apparatus to determine based on the analysis whether flash is to be used in any of the images to be captured for the multi-exposure image.

In an embodiment, in any combination with any of the above embodiments, the at least one memory stores program instructions that, when executed by the at least one processing unit, cause the apparatus to detect a face in the series of images, and limit the number of the images to be captured for the multi-exposure image in response to the detection.

In an embodiment, in any combination with any of the above embodiments, the at least one memory stores program instructions that, when executed by the at least one processing unit, cause the apparatus to adapt, based on the analysis, the number of images to be captured for the multi-exposure image.

In an embodiment, in any combination with any of the above embodiments, the apparatus is implemented as one of a mobile phone, a mobile device or a digital camera.

In an embodiment, in any combination with any of the above embodiments, the image sensor supports interlaced exposure.

According to another aspect, there is provided an apparatus comprising a camera comprising an image sensor configured to capture image data of a scene, the image sensor having at least two sets of pixels enabling different exposure times, a viewfinder configured to display image data captured with the image sensor, and a controller configured to control a first set of pixels of the image sensor for exposure for the viewfinder and a second set of pixels of the image sensor for exposure analysis of the scene for images to be captured for a multi-exposure image.

In an embodiment, the controller configured to cause capture of a series of images with different exposure times with the second set of pixels, analyze the series of images to determine light intensity of different areas of the scene, and determine exposure times for the images to be captured for the multi-exposure image based on the analysis.

In an embodiment, in any combination with any of the above embodiments, the controller is configured to determine based on the analysis whether flash is to be used in the images to be captured for the multi-exposure image.

In an embodiment, in any combination with any of the above embodiments, the controller is configured to adapt, based on the analysis, the number of images to be captured for the multi-exposure image.

In an embodiment, in any combination with any of the above embodiments, the controller is configured to detect a face in the series of images, and limit the number of the images to be captured for the multi-exposure image in response to the detection.

In an embodiment, in any combination with any of the above embodiments, the apparatus is implemented as one of a mobile phone, a mobile device or a digital camera.

In an embodiment, in any combination with any of the above embodiments, the image sensor supports interlaced exposure.

According to another aspect, there is provided a method comprising controlling, by at least one processor, a first set of pixels of an image sensor for exposure of a scene for a camera viewfinder, the image sensor having at least two sets of pixels enabling different exposure times, and controlling, by the at least one processor, a second set of pixels of the image sensor for exposure analysis of the scene for images to be captured for a multi-exposure image.

In an embodiment, the method further comprises causing, by the at least one processor, capture of a series of images with different exposure times with the second set of pixels, analyzing, by the at least one processor, the series of images to determine light intensity of different areas of the scene, and determining, by the at least one processor, exposure times for the images to be captured for the multi-exposure image based on the analysis.

In an embodiment, in any combination with any of the above embodiments, the method further comprises determining, by the at least one processor, based on the analysis whether flash is to be used in any of the images to be captured for the multi-exposure image.

In an embodiment, in any combination with any of the above embodiments, the method further comprises adapting, by the at least one processor, based on the analysis the number of images to be captured for the multi-exposure image.

In an embodiment, in any combination with any of the above embodiments, the method further comprises detecting, by the at least one processor, a face in the series of images, and limiting, by the at least one processor, the number of the images to be captured for the multi-exposure image in response to the detection.

In an embodiment, in any combination with any of the above embodiments, the image sensor supports interlaced exposure.

According to another aspect, there is provided a computer program comprising program code, which when executed by at least one processor, causes an apparatus to control a first set of pixels of an image sensor for exposure of a scene for a camera viewfinder, the image sensor having at least two sets of pixels enabling different exposure times, and control a second set of pixels of the image sensor for exposure analysis of the scene for images to be captured for a multi-exposure image.

According to another aspect, there is provided a computer-readable medium comprising a computer program comprising program code, which when executed by at least one processor, causes an apparatus to control a first set of pixels of an image sensor for exposure of a scene for a camera viewfinder, the image sensor having at least two sets of pixels enabling different exposure times, and control a second set of pixels of the image sensor for exposure analysis of the scene for images to be captured for a multi-exposure image.

According to another aspect, there is provided an apparatus comprising means for controlling a first set of pixels of an image sensor for exposure of a scene for a camera viewfinder, the image sensor having at least two sets of pixels enabling different exposure times, and means for controlling a second set of pixels of the image sensor for exposure analysis of the scene for images to be captured for a multi-exposure image.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

The functions described herein performed by a controller or a processor may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include disks, thumb drives, memory etc. and do not include propagated signals. The software can be suitable for execution on a parallel processor or a serial processor such that the method steps may be carried out in any suitable order, or simultaneously.

Although the subject matter may have been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages.

Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. An apparatus comprising:
   at least one processing unit;
   at least one memory;
   wherein the at least one memory stores program instructions that, when executed by the at least one processing unit, cause the apparatus to:
   control a first set of pixels of an image sensor for exposure of a scene for a camera viewfinder, the image sensor having at least two separate sets of pixels enabling different exposure times;
   control a second set of pixels of the image sensor, separate from the first set of pixels of the image sensor, for exposure analysis of the scene for images to be captured for a multi-exposure image; and
   capture and analyze an image with the second set of pixels to determine light intensity of different areas of the scene.

2. An apparatus of claim 1, wherein the at least one memory stores program instructions that, when executed by the at least one processing unit, cause the apparatus to:
   cause capture of a series of images with different exposure times with the second set of pixels;
   analyze the series of images to determine light intensity of different areas of the scene; and
   determine exposure times for the images to be captured for the multi-exposure image based on the analysis.

3. An apparatus of claim 2, wherein the at least one memory stores program instructions that, when executed by the at least one processing unit, cause the apparatus to:
   determine based on the analysis whether flash is to be used in any of the images to be captured for the multi-exposure image.

4. An apparatus of claim 2, wherein the at least one memory stores program instructions that, when executed by the at least one processing unit, cause the apparatus to:
   detect a face in the series of images; and
   limit the number of the images to be captured for the multi-exposure image in response to the detection.

5. An apparatus of claim 2, wherein the at least one memory stores program instructions that, when executed by the at least one processing unit, cause the apparatus to:
   adapt, based on the analysis, the number of images to be captured for the multi-exposure image.

6. An apparatus of claim 1, wherein the image sensor supports interlaced exposure.

7. An apparatus comprising:
   a camera comprising an image sensor configured to capture image data of a scene, the image sensor having at least two separate sets of pixels enabling different exposure times;
   a viewfinder configured to display image data captured with the image sensor; and
   a controller configured to control a first set of pixels of the image sensor for exposure for the viewfinder and a second set of pixels, separate from the first set of pixels of the image sensor, of the image sensor for exposure analysis of the scene for images to be captured for a multi-exposure image, and capture and analyze an image with the second set of pixels to determine light intensity of different areas of the scene.

8. An apparatus of claim 7, wherein the controller is configured to:
   cause capture of a series of images with different exposure times with the second set of pixels;
   analyze the series of images to determine light intensity of different areas of the scene; and
   determine exposure times for the images to be captured for the multi-exposure image based on the analysis.

9. An apparatus of claim 8, wherein the controller is configured to:
   determine based on the analysis whether flash is to be used in the images to be captured for the multi-exposure image.

10. An apparatus of claim 8, wherein the controller is configured to:
    adapt, based on the analysis, the number of images to be captured for the multi-exposure image.

11. An apparatus of claim 8, wherein the controller is configured to:
    detect a face in the series of images; and
    limit the number of the images to be captured for the multi-exposure image in response to the detection.

12. An apparatus of claim 7, implemented as one of a mobile phone, a mobile device or a digital camera.

13. An apparatus of claim 7, wherein the image sensor supports interlaced exposure.

14. A method comprising:
    controlling, by at least one processor, a first set of pixels of an image sensor for exposure of a scene for a camera viewfinder, the image sensor having at least two separate sets of pixels enabling different exposure times;
    controlling, by the at least one processor, a second set of pixels, separate from the first set of pixels of the image sensor, of the image sensor for exposure analysis of the scene for images to be captured for a multi-exposure image; and
    capturing and analyzing an image with the second set of pixels to determine light intensity of different areas of the scene.

15. A method of claim 14, further comprising:
    causing, by the at least one processor, capture of a series of images with different exposure times with the second set of pixels;
    analyzing, by the at least one processor, the series of images to determine light intensity of different areas of the scene; and
    determining, by the at least one processor, exposure times for the images to be captured for the multi-exposure image based on the analysis.

16. A method of claim 15, further comprising:
    determining, by the at least one processor, based on the analysis whether flash is to be used in any of the images to be captured for the multi-exposure image.

17. A method of claim 15, further comprising:
    adapting, by the at least one processor, based on the analysis the number of images to be captured for the multi-exposure image.

18. A method of claim 15, further comprising:
   detecting, by the at least one processor, a face in the series of images; and
   limiting, by the at least one processor, the number of the images to be captured for the multi-exposure image in response to the detection.

19. A method of claim 14, wherein the image sensor supports interlaced exposure.

20. An apparatus of claim 1, wherein the two separate sets of pixels are controlled at the same time.

* * * * *